United States Patent [19]

Owen et al.

[11] Patent Number: 4,890,580

[45] Date of Patent: Jan. 2, 1990

[54] ELECTRONIC FLEA-REPELLING DEVICE INCLUDING AN INTEGRATED CIRCUIT

[75] Inventors: Charles W. Owen; Roberto A. Garcia, both of Miami, Fla.

[73] Assignee: Elexis Corporation, Miami, Fla.

[21] Appl. No.: 203,446

[22] Filed: Jun. 7, 1988

[51] Int. Cl.[4] .......................... A01K 29/00; H04B 1/02
[52] U.S. Cl. ....................................... 119/156; 367/139
[58] Field of Search ........................ 119/29, 106, 156; 367/139

[56] References Cited

U.S. PATENT DOCUMENTS

| 4,566,085 | 1/1986 | Weinberg | 367/139 |
| 4,669,424 | 6/1987 | Bianco et al. | 119/156 |
| 4,725,993 | 2/1988 | Owen et al. | 367/139 |
| 4,748,938 | 6/1988 | Owen et al. | 119/156 |

FOREIGN PATENT DOCUMENTS

3316196  11/1984  Fed. Rep. of Germany ........ 119/29

Primary Examiner—Robert P. Swiatek
Attorney, Agent, or Firm—Lowe, Price, LeBlanc, Becker & Shur

[57] ABSTRACT

A portable electronic flea-repelling collar for domestic animals activated by a self-contained battery comprises a printed circuit board on which are mounted an electrical to ultrasonic transducer, an integrated circuit for deriving periodic electric pulses having relatively low duty cycle and an ultrasonic carrier and leads interconnecting the battery, transducer and integrated circuit. The period, amplitude, duty cycle and carrier frequency of ultrasonic pulses emitted by the transducer in response to electric pulses derived from the integrated circuit repel fleas from the animal. The integrated circuit is sandwiched between the printed circuit board and the transducer. The printed circuit board carries a spring clip that mechanically and electrically contacts a first electrode on a first face of the battery. A second electrode on a second face of the battery is urged by the spring clip against a contact area on the printed circuit board. The spring clip portion contacting the first battery electrode is biased toward the printed circuit board at a position remote from all contact areas for the second battery electrode. First and second mutually insulated test contacts on a face of the printed circuit board opposite from the face where the spring clip, integrated circuit and transducer are mounted are connected to the spring clip and the contact area for the first battery electrode by plated through holes on the printed circuit board.

25 Claims, 4 Drawing Sheets

ELECTRONIC FLEA-REPELLING DEVICE INCLUDING AN INTEGRATED CIRCUIT

FIELD OF INVENTION

The present invention relates generally to portable electronic flea-repelling devices for domestic animals, such as dogs and cats, and, more particularly, to a portable electronic flea-repelling device including an integrated circuit for deriving relatively low duty cycle periodic pulses having an ultrasonic carrier frequency. In accordance with one aspect of the invention, the integrated circuit and a transducer for converting electric pulses from the integrated circuit into ultrasonic pulses have superimposed areas on the printed circuit board. In accordance with another aspect of the invention, the printed circuit board carries a spring clip for contacting a first electrode on a first face of a battery for activating a circuit and transducer and a second electrode on a second face of the battery is urged by the spring clip against a contact area on the printed circuit board.

BACKGROUND ART

In U.S. Pat. Nos. 4,669,424 and 4,725,993 and commonly assigned U.S. patent application Ser. No. 030,909, filed Mar. 30, 1987, and Now U.S. Pat. No. 4,748,938, there are disclosed various devices utilizing periodic, relatively low duty cycle ultrasonic compressional wave pulses for repelling fleas from domestic animals, such as dogs and cats. The devices are adapted to be mounted on a collar to direct ultrasonic compressional waves to various parts of the animal. It has been found that ultrasonic pulses having the required amplitude, duty cycle, carrier frequency and period are capable of ridding domestic animals, such as dogs and cats, from fleas.

The devices disclosed in the aforementioned patents and application have been found to be successful. They have achieved the desired pest repulsion for periods of between six months and one year in response to energy derived from batteries carried within housings for the devices.

The devices disclosed in the aforementioned patents and application are discrete component devices. In attempts to decrease the volume, weight, cost and energy consumption of the devices disclosed in the aforementioned patents and application, integrated circuits have been used. It is, however, desirable to reduce even further the volume, weight, energy and cost requirements of the prior art electronic flea-repelling devices for domestic animals, such as dogs and cats.

It is, accordingly, an object of the present invention to provide a new and improved electronic flea-repelling device adapted to be carried on a domestic animal, such as a dog or cat.

Yet a further object of the invention is to provide a new and improved integrated circuit electronic flea-repelling device adapted to be carried by domestic animals, such as dogs and cats, wherein the device has smaller volume and weight characteristics than the prior art, is capable of emitting power for a relatively long time interval, and is relatively inexpensive to manufacture and produce.

Another object of the invention is to provide a new and improved electronic flea-repelling device including an integrated circuit for deriving periodic pulses having a duty cycle, carrier frequency and amplitude for repelling fleas from domestic animals, such as dogs and cats.

A further object of the invention is to provide a new and improved integrated circuit electronic flea-repelling device to be worn by domestic animals wherein the integrated circuit uses the same area on a printed circuit board as an electric wave to ultrasonic wave transducer.

Still another object of the invention is to provide a new and improved integrated circuit flea-repelling device adapted to be carried by dogs and cats in a variety of different housings.

Still another object of the invention is to provide a new and improved integrated circuit flea-repelling device adapted to be carried by domestic animals, such as dogs and cats, and which is adapted to be easily tested.

THE INVENTION

In accordance with one aspect of the present invention, a portable electronic flea-repelling device adapted to be mounted on a domestic animal and activated by a self-contained battery comprises a printed circuit board, an electric to ultrasonic transducer, and means including an integrated circuit for deriving periodic relatively low duty cycle electric pulses having an ultrasonic carrier frequency, wherein the transducer and a housing for the integrated circuit are carried on the printed circuit board so the transducer area is superimposed on the integrated circuit housing area. The printed circuit board includes deposited leads for interconnecting the battery, transducer and integrated circuit so the electric pulses derived from the integrated circuit are connected to drive the transducer. The period, amplitude, duty cycle and carrier frequency of ultrasonic pulses derived from the transducer in response to the electric pulses derived from the integrated circuit are such as to repel fleas from the animal. The integrated circuit housing and transducer are preferably mounted above the same face of the printed circuit board in such a position that the integrated circuit housing is sandwiched between parallel flat faces of the printed circuit board and a housing for the transducer. In the preferred embodiment, the ultrasonic pulses are directed to the surface beneath the animal to be reflected from that surface back to the underneath parts of the animal.

In accordance with a second aspect of the invention, a portable electronic flea-repelling device adapted to be mounted on a domestic animal and activated by a self-contained battery having parallel flat faces comprises a printed circuit board, an electric to ultrasonic transducer, a circuit for deriving periodic relatively low duty cycle electric pulses having an ultrasonic carrier frequency, and a spring clip for holding the battery in situ and establishing an electric connection to it. The printed circuit board carries the transducer, circuit and spring clip so the spring clip contacts a first electrode on a first face of the battery and is connected by a deposited lead on the printed circuit board to a power supply terminal of the circuit. A second electrode on a second face of the battery is urged by the spring clip against a contact area on the printed circuit board, which contact area is connected by other deposited leads on the printed circuit board to another power supply terminal of the circuit. A portion of the spring clip contacting the first electrode is biased toward the printed circuit board at a position remote from all contact areas for the second battery electrode. First and second mutually insulated test contacts on the printed circuit board are connected by deposited leads on the printed circuit board to the spring clip and the contact area for the second battery electrode. Such an arrangement enables an external DC power supply, i.e., a supply other than the battery, to energize the circuit during device testing at the time of manufacture. Testing without the battery in situ reduces production expenses.

According to a further aspect of the invention, the electric pulse deriving means includes an oscillator crystal carried on the printed circuit board and connected to an integrated circuit by leads on the printed circuit board. Passive components, such as resistive and capacitive elements, are carried on the printed circuit board and connected to the integrated circuit by leads on the printed circuit board.

The above and still further objects, features and advantages of the present invention will become apparent upon consideration of the following detailed description of a specific embodiment thereof, especially when taken in conjunction with the accompanying drawings.

DESCRIPTION OF PREFERRED EMBODIMENT

Figure 1:
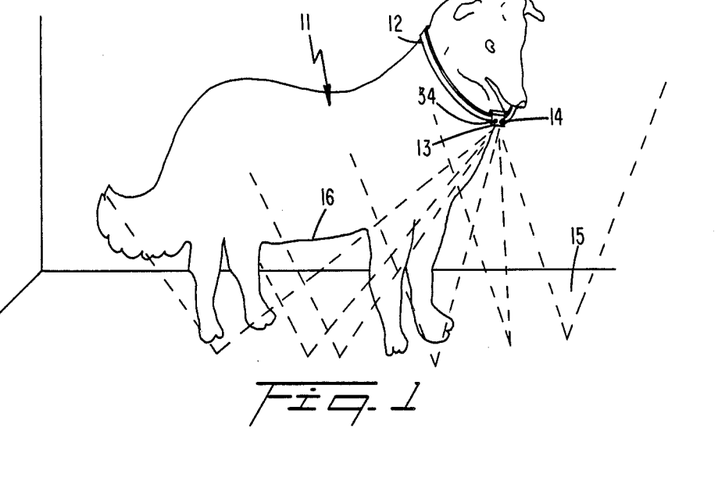
FIG. 1 is a schematic diagram of a preferred arrangement in which the present invention is utilized.

Reference is now made to FIG. 1 of the drawing wherein dog 11 is illustrated as including a neck collar 12 on which is mounted case 13. Contained in case 13 are an electric signal to ultrasonic compressional wave transducer 14, in the form of a piezo electric crystal mounted in a resonant cavity, as described in U.S. Pat. No. 4,669,424. Transducer 14 is driven by electronic circuitry contained in case 13 and powered by a lithium dry cell battery also contained in the case. Case 13 is placed on collar 12 around the neck of dog 11 so that ultrasonic compressional waves derived from transducer 14 are directed downwardly away from the dog. The ultrasonic compressional waves are directed in a wide angle beam toward surface 15 on which dog 11 is standing, sitting or lying.

The energy in the compressional wave beam derived from transducer 14 is reflected from surface 15 on which dog 11 is standing so that the angle of incidence of the beam impinging on surface 15 is equal to the angle of reflection. Thereby, the ultrasonic compressional wave energy reflected from surface 15 is incident on virtually all under parts 16 of dog 11. It has been found that the specific embodiment described infra provides an effective coverage having a total length of approximately eight feet, with the center of the coverage being approximately directly below case 13. By reflecting the energy of transducer 14 from surface 15, a large coverage area consistent with the under parts of dog 11 is conveniently provided.

The reflected ultrasonic compressional wave energy incident on dog 11 is preferably pulsed at a rate in the audio range of about 20 to 300 cycles per second with a relatively low duty cycle of less than 50%, preferably in the range of about 3% to 30%. Each compressional wave pulse derived from transducer 14 has a single ultrasonic frequency, preferably in the 35 KHZ-45 KHz. In tests that have actually been performed these parameters have been found to be effective in repelling fleas from a very high percentage of dogs and cats. The amplitude of the compressional wave pulses is such that the intensity of the ultrasonic waves incident on the underside of the animal after reflection, is at least about 85 db.

The 35 to 45 KHz frequency is above the range which can be perceived by the ears of domestic animals, such as dogs and cats, so that the animal is not annoyed by the ultrasonic compressional wave energy emitted by transducer 14. While the power emitted from transducer 14 and reflected back to dog 11 is not adequate to kill the pests on the dog, it is sufficient to repel the pests from the dog. A human can easily perceive whether the electronic circuitry in case 13 is properly operating and whether the battery energizing the electronic circuit which drives transducer 14 has sufficient power to repel the pests on dog 11. An audio frequency click derived from transducer 14 can be heard by the vast majority of humans if the transducer is placed close to the human ear. Thereby, the vast majority of humans can conveniently detect if the electronic circuitry in case 13 is properly activating transducer 14. The intensity level of the ultrasonic compressional wave energy derived by transducer 14 is inferentially determined as being adequate since a pulsed light source, in the form of light emitting diode 34 is mounted on case 13. While the battery powering the electronic circuitry which drives transducer 14 has adequate power to provide the pest repulsion function, light emitting diode 34 is pulsed on and off. If, however, the battery does not have adequate energy to provide the repulsion function, light emitting diode 34 does not emit light and a human is advised that it is necessary to replace the battery.

Figure 2:
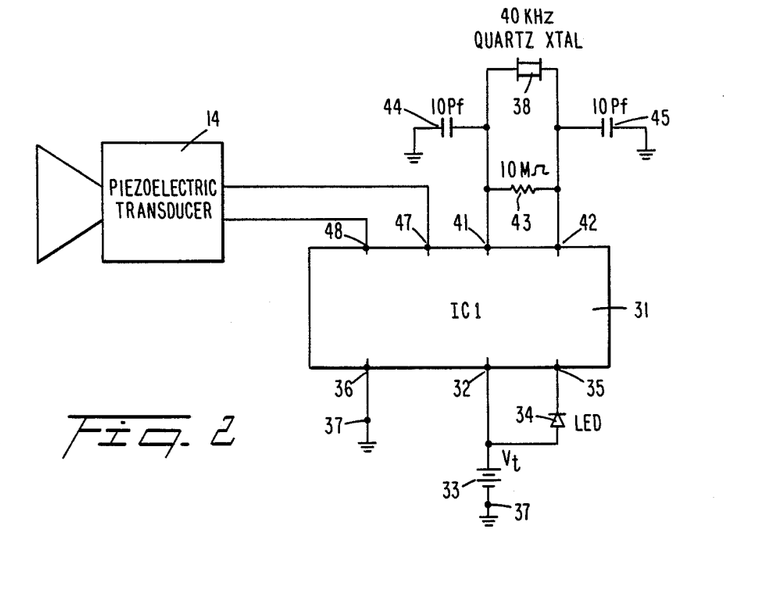
FIG. 2 is a circuit diagram of external connections of an integrated circuit employed in the flea-repelling device of FIG. 1.

A schematic diagram of the circuitry for driving piezoelectric transducer 14 for converting electric waves to compressional waves is illustrated in FIG. 2 as including integrated circuit 31, powered by battery 33 having a positive electrode connected to terminal 32, also connected to an anode of light-emitting diode 34, having a cathode connected to integrated circuit terminal 35. Terminal 36 of integrated circuit 31 is connected to ground terminal 37, as is the negative electrode of battery 33.

Integrated circuit 31 includes an oscillator having a frequency regulated by the oscillating frequency of quartz crystal 38, connected to terminals 41 and 42 of integrated circuit 31 by a network including resistor 43 that shunts the quartz crystal and capacitors 44 and 45 connected to shunt opposite electrodes of the quartz crystal to ground. Integrated circuit 31 includes output terminals 47 and 48 connected to piezoelectric transducer 14, having a radiating face preferably pointed toward the surface on which animal 11 is located. Integrated circuit 31 responds to the network including quartz crystal 34 and the power supplied to it by battery 33 to supply periodic pulses having a relatively low duty cycle and an ultrasonic carrier frequency to piezoelectric transducer 14. Transducer 14 responds to the electric waveform supplied to it by integrated circuit 31 to convert the electric waveform into an ultrasonic waveform that is basically a replica of the electric waveform. In the preferred embodiment, ultrasonic piezoelectric transducer 14 derives pulses preferably having a repetition frequency of approximately 20 Hertz, a duty cycle of about four percent, a carrier frequency of 40 kiloHertz (the oscillating frequency of quartz crystal 38) and an amplitude such that the reflected ultrasonic energy incident on animal 11 has a level of at least about 85 db.

To provide an indication that transducer 14 is being properly activated by electric energy, light-emitting diode 34 is periodically activated at a frequency of about four times a minute in response to pulses derived by integrated circuit 31 and supplied to terminal 35, thence to the cathode of diode 34.

Figure 3:
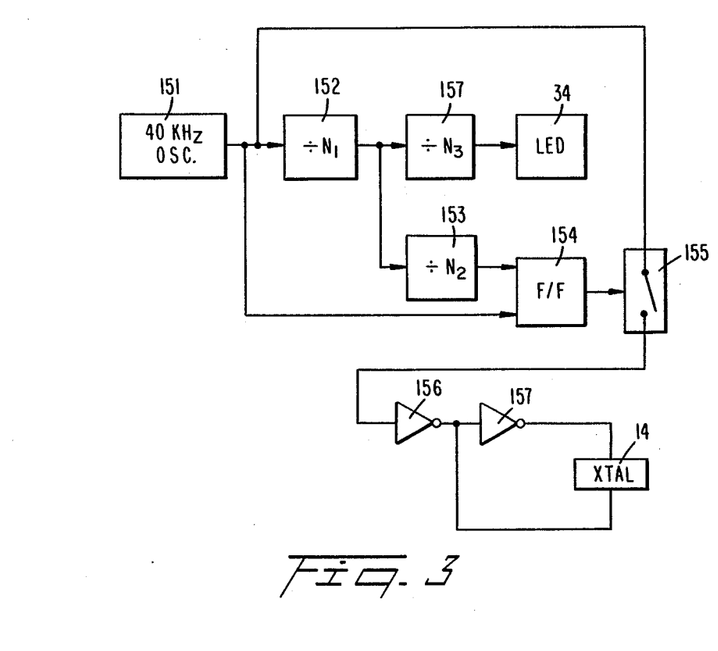
FIG. 3 is a block diagram of the electronic circuit included in the integrated circuit illustrated in FIG. 2.

A preferred embodiment of the components included in integrated circuit 31 for driving transducer 14 and light-emitting diode 34 is illustrated in FIG. 3 as including 40 kiloHertz oscillator 151. Oscillator 151 includes quartz crystal 38, resistor 42 and capacitors 33 and 34. Oscillator 151 derives a 40 kiloHertz waveform that is supplied in parallel to divide by $N_1$ and divide by $N_2$ frequency dividers 152 and 153, having outputs which are combined in flip flop 154 which derives a periodic waveform having a relatively low duty cycle that is applied as a control input to switch 55. In the preferred embodiment, the values of $N_1$ and $N_2$ are selected so the frequency of the periodic waveform derived by flip flop 154 is in the range of about 10–300 Hertz, with a duty cycle in the range of 3 to approximately 30 percent; the output frequency and duty cycle of the output of flip flop 154 are determined by the frequency of oscillator 151 and the values of $N_1$ and $N_2$. The 40 kiloHertz output of oscillator 151 is also applied to switch 155 so that when switch 155 is closed in response to the low duty cycle periodic output pulses of flip flop 154, the 40 kiloHertz waveform from oscillator 151 is supplied to cascaded unity gain inverting amplifiers 156 and 157, respectively having output terminals connected to opposite electrodes of transducer 14. Thereby, the opposite electrodes of transducer 14 are supplied with complementary, i.e., opposite phase, 40 kilohertz waveforms that form the carrier for the low duty cycle periodic pulses derived from flip flop 154.

To activate light-emitting diode 34, the output pulses of divide by $N_1$ frequency divider 152 are supplied to divide by $N_3$ frequency divider 157, which derives a low frequency, periodic waveform that occurs approximately once every fifteen seconds. The output waveform of frequency divider 157 is suppled to light-emitting diode 34, so that the light-emitting diode is activated to emit a light pulse each time a low frequency pulse is derived from frequency divider 157.

All of the active elements in integrated circuit 31 are powered by connections (not shown in FIG. 4) to the positive and negative electrodes of battery 33 via connections to integrated circuit terminals 32 and 36. When the output voltage of battery 33 is below a level that enables transducer 14 to derive the required ultrasonic amplitude for flea repulsion, the output voltage of pulses supplied by divider 157 to light emitting diode 34 drops to a level less than that necessary to activate the diode into a light-emitting state. A handler for animal 11 wearing the flea repeller of the invention is thereby constantly apprised of the ability of the device to repel fleas. Such an indication can also be obtained by holding the emitting face of transducer 14 against the ear and observing acoustic "clicks" as described in U.S. Pat. No. 4,669,424.

Reference is now made to FIGS. 4–7 of the drawing wherein the preferred embodiment of the physical configuration of the present invention is illustrated as including dielectric generally T-shaped planar printed circuit board 51 including stem 52 from which extend ears 53 and 54.

Figure 4:
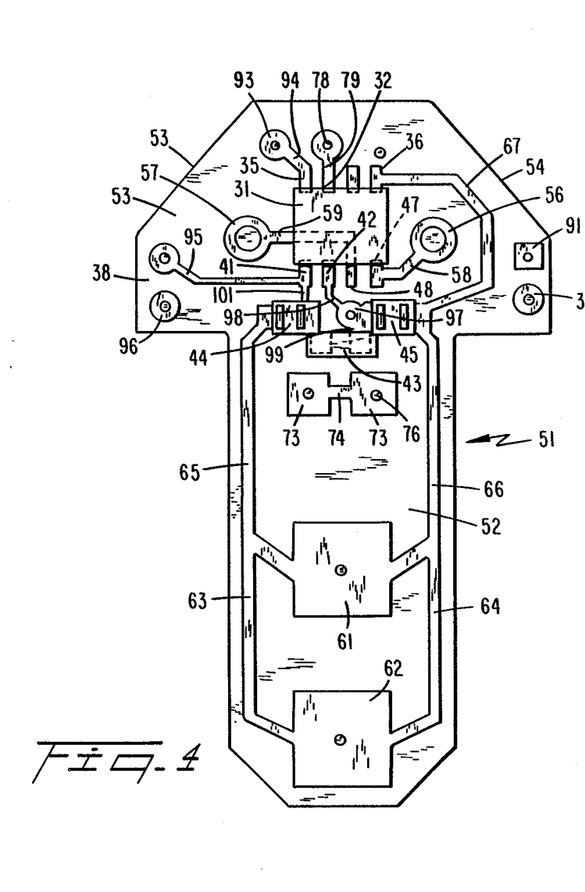
FIG. 4 is a top view of a partially assembled printed circuit board in accordance with a preferred embodiment of the present invention.

Printed circuit board 51 includes, on the opposite, parallel planar faces thereof, deposited metal (preferably aluminum) leads, plated through holes for establishing electrical connections between the leads on the opposite faces of the printed circuit board, and contact areas for establishing the electrical connections described in connection with FIG. 2. Stem 52 carries battery 33, while integrated circuit 31, contained in a dielectric case, and transducer 14 are carried by the portion of stem 52 between ears 53 and 54. The dielectric case of integrated circuit 31 and metal housing of transducer 14 are superimposed on the same area of printed circuit board 51, with the integrated circuit case being sandwiched between opposite, planar parallel faces of the printed circuit board and the housing of transducer 14. The emitting face of the transducer housing is opposite from the face of the transducer housing contacting the case for integrated circuit 31. The housing of integrated circuit 31 is fixedly mounted to printed circuit board 51 by double-sided adhesive tape. Transducer 14 is fixedly mounted on printed circuit board 51 by electrical connections established between rigid metal lead wires extending from the transducer to metal contact pads 56 and 57 on the printed circuit board directly beneath the transducer housing and beyond the perimeter of the case for integrated circuit 31. Metal pads 56 and 57 are respectively connected to terminals 47 and 48 of integrated circuit 31 by metal leads 58 and 59 deposited on printed circuit board 51.

Battery 33 preferably has a flat circular case, having planar, parallel electrically insulated positive and negative electrodes defining the bottom and top faces of the battery case, respectively. The entire battery has an appearance resembling that of a coin having the approximate size of a twenty-five cent U.S. piece. Preferably, battery 33 is a conventional lithium battery capable of powering integrated circuit 31 and the remaining circuitry included on printed circuit board 51 for a period of approximately one year.

The bottom, negative electrode of battery 33 is mechanically and electrically connected to metal pads 61 and 62 respectively located approximately at the center and lower portion of stem 52, i.e., the portion of the stem remote from ears 53 and 54. Pads 61 and 62 are connected to each other and to electrodes of capacitors 44 and 45 and to integrated circuit terminal 36 by metal leads 63–67 deposited on the same face of printed circuit board 51 where pads 61 and 62, capacitors 44 and 45, and integrated circuit 31 are located. Two contact pads 61 and 62 are provided for the negative electrode of battery 33 to enable the battery to be positioned at different points along stem 52. It is desirable to position battery 33 at different positions along the length of stem 52 to enable the same printed circuit board 51 and the assembly associated therewith to be used with different casings, such as the casings disclosed in U.S. Pat. No. 4,669,424 and U.S. patent application Ser. No. 030,909, now U.S. Pat. No. 4,748,938.

The positive electrode of battery 33, on the upper planar face thereof, is electrically connected to metal leaf spring clip 71 that urges the battery into contact with printed circuit board 51. Leaf spring clip 71 exerts a compressional force against the upper face of battery 33 so that the opposite, parallel faces of the battery are sandwiched between the spring clip and stem 52 of printed circuit board 51, causing good electrical and mechanical contact to be made by the negative and positive electrodes forming the bottom and top faces of the battery with at least one of pads 61 and 62 and spring clip 71, respectively. Spring clip 71 includes one end 72 that is fixedly secured, preferably by soldering or braising, to metal contact pads 73 on the portion of stem 52 just below the portion of the stem from which ears 53 and 54 extend. Pads 73 are deposited on the same face of printed circuit board 51 that carries the case of integrated circuit 31; the pads are connected to each other by deposited lead 74. Metal spring 71 includes, close to the free end thereof, a curved portion 75 which engages the upper face forming the positive electrode of battery 33. When battery 33 is not in position on printed circuit board 51 curved portion 75 engages a portion of the printed circuit board between pads 61 and 62 and which is remote from all of the leads connected to these pads, so that the spring clip is electrically insulated from pads 61 and 62 and the leads connected thereto. Such a configuration is important to enable test voltages to be applied to test pads on the back face of printed circuit board 51, i.e., the face of the printed circuit board remote from the face carrying integrated circuit 31, while battery 33 is not in place on printed circuit board 51.

Figures 6, 7:
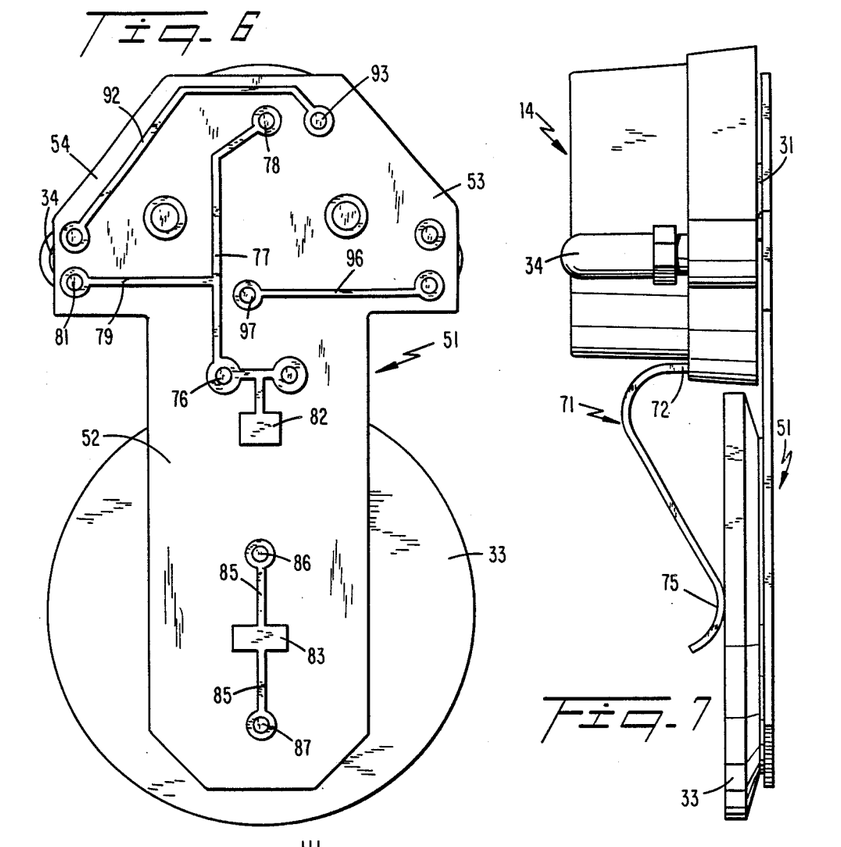
FIG. 6 is a bottom view of the printed circuit board illustrated in FIGS. 4 and 5.
FIG. 7 is a side view of an assembled printed circuit board and battery of the device illustrated in FIGS. 4–6.

Electrical connections from pads 73 to integrated circuit terminal 32 are established by plated through hole 76 to the back side of printed circuit board 51, thence via lead 77 deposited on the printed circuit back side. From lead 77 the connection continues to plated through hole 78 to lead 79 on the front face or side of printed circuit board. A connection also subsists from one of pads 73 via through hole 76 to the anode of light emitting diode 34 via lead 79 and plated through hole 81; lead 79 is connected to lead 77 on the back side of printed circuit board 51.

To establish test connections for positive and negative terminals of an external DC source during testing, without inserting a battery on printed circuit board 51, metal contact areas 82 and 83 are deposited on the back side of the printed circuit board. Contact area 82 is connected by plated through hole 76 to contact pad 73 to provide the same function for the positive electrode of the external DC test source as the connection of spring clip 75 to the positive electrode of battery 33. Contact area 83 is connected by plated lead 85 and plated through holes 86 and 87 to contact pads 61 and 62, respectively, to provide the same connections to the negative electrode of the external source as for the negative electrode of battery 33.

The cathode of light-emitting diode 34 is connected by plated through hole 91 to plated lead 92 on the back side of printed circuit board 51, thence via plated through hole 93 and plated lead 94 on the front side of the printed circuit board to integrated circuit terminal 35.

One electrode of quartz crystal 38, mounted on the front face of printed circuit board 51, is connected by lead 95 on the front face of the printed circuit board to integrated circuit terminal 41. The remaining electrode of quartz crystal 38 is connected by plated through hole 96 to lead 97 on the back side of the printed circuit board, thence via plated through hole 97 to an electrode of capacitor 45 and to a terminal of resistor 43, both of which are mounted on the front face of printed circuit board 51. Lead 98 on the front face of printed circuit board 51 connects plated through hole 97 and the components connected to the through hole to integrated circuit terminal 42. The remaining lead of resistor 43 and an electrode of capacitor 44 and terminal 41 are connected to each other by plated leads 99 and 101 on the front face of printed circuit board 51. Capacitors 44 and 45, as well as resistor 43, are clustered in very close proximity to each other in close proximity to the center line of stem 52, as well as in close proximity to integrated circuit oscillator terminals 41 and 42 and to quartz crystal 38 to minimize stray reactances between the discrete passive components, i.e., the capacitors and resistor, and the quartz crystal, as well as the oscillator circuitry within integrated circuit 31.

Figure 5:
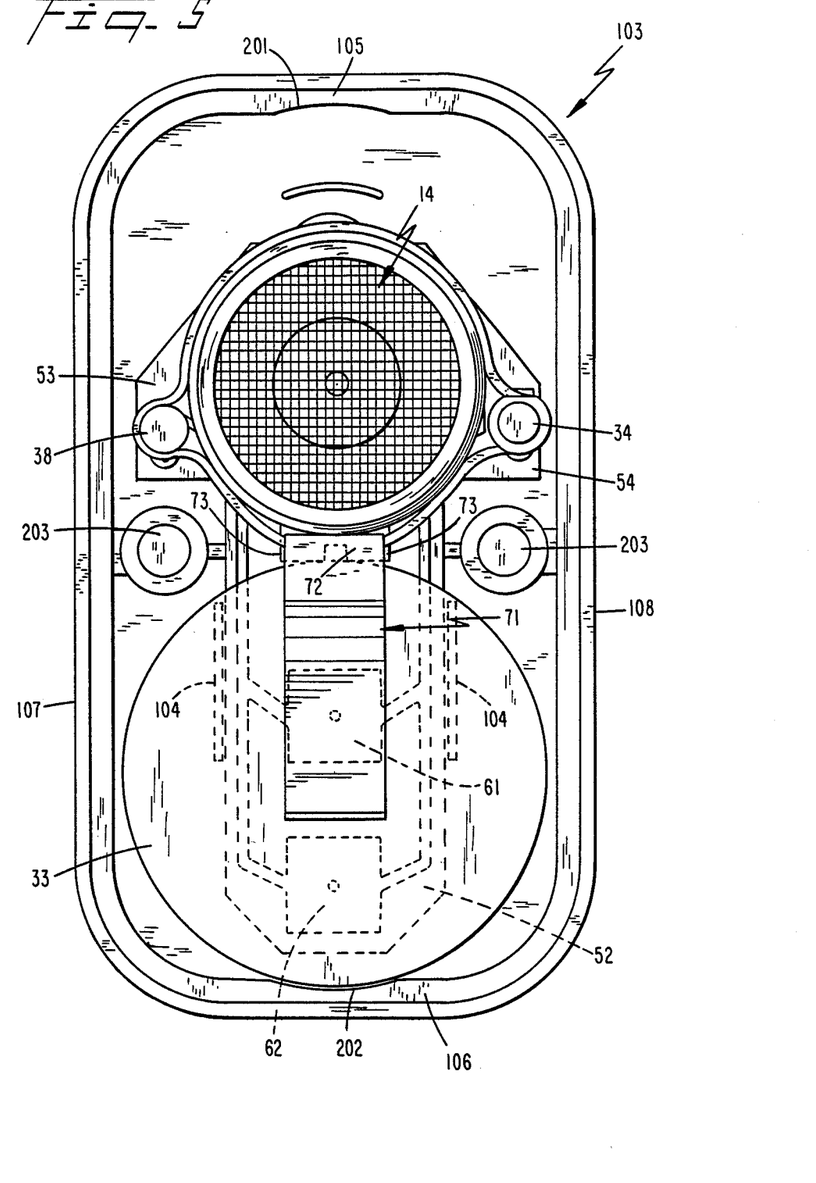
FIG. 5 is a top view of a completely assembled printed circuit board with a spring assembly in a housing in accordance with a preferred embodiment of the present invention.

Printed circuit board 51 and the components mounted therein can be placed in several different cases. In FIG. 5 printed circuit board 51 is illustrated as being located in the base of case 103 having the same exterior configuration as the case specifically described and illustrated in commonly assigned, copending Application Serial No. 030,909. The base of the case includes upwardly projecting ribs 104 which extend parallel to and in close proximity with the exterior, longitudinally extending walls of stem 52, to assist in holding the stem and the remainder of printed circuit board 51 in situ in the case. Case 103 includes upwardly extending ridges 105 and 106 which extend parallel and in close proximity to the top and bottom edges of printed circuit board 105, to assist in holding the printed circuit board in place. Ridges 105 and 106 respectively include arcuate indentations 201 and 202, one of which engages the periphery of battery 33 to assist in holding the battery in place. Case 103 is symmetrical to enable printed circuit 51 to be fitted therein so the periphery of battery 33 can bear against either indentation 201 or 202, to facilitate assembly. Movement of printed circuit board 51 in a direction transverse to the longitudinal axis of stem 52 is also restricted to a certain extent by the close proximity and parallel relationship between flanges 107 and 108 which extend along the sides of case 103 and the edges of the printed circuit board defining the ends of ears 53 and 54. Movement of printed circuit board 51 in a plane at right angles to the plane of the sheet containing FIGS. 3 and 4 is restrained by cover 111, FIG. 8, that is held in place on base 103 by self-tapping screws (not shown) extending through punch out regions 203 on the transverse center line of base 103 into cover 111.

Figure 8:
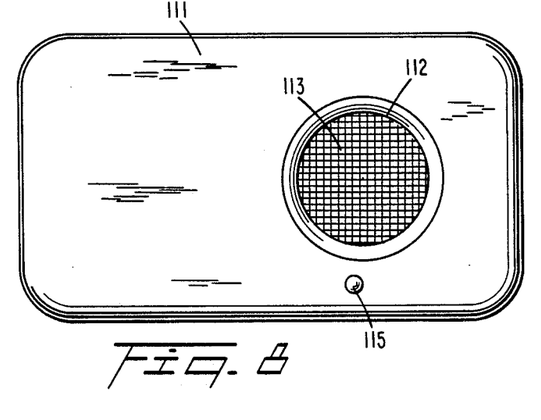
FIG. 8 is a top view of the housing illustrated in FIG. 5 in combination with exposed elements on the printed circuit board.

Cover 111 includes circular opening 112 having a diameter slightly less than the diameter of the case for circular transducer 14. Opening 112 is positioned on cover 111 at a position so that the centers of the transducer case and opening are coincident. The case of transducer 14 includes grill 113 so that the oscillating transducer components are protected and to permit radiation of the ultrasonic energy derived from the transducer to the surface beneath dog 11, as described in U.S. Pat. No. 4,669,424.

Cover 111 also includes circular opening 114, having a center coincident with the center of tubular envelope 115 of light-emitting diode 34. Envelope 115 extends into the bottom of opening 114 and is held in place by the wall of cover 111 defining the perimeter of opening 114.

In the device which has been actually built, printed circuit board 51 has a total length of 1.5 inches and a width, between the parallel edges of ears 53 and 54, of 0.87 inches. The device is capable of emitting sufficient power for approximately one year to repel fleas from domestic animals such as dogs and cats. While the power requirements for transducer 14 are being met, light-emitting diode 34 is pulsed at a rate of approximately four times per minute. When the energy level of battery 33 has decreased such that sufficient power is no longer being delivered by transducer 14 for the flea repulsion function, insufficient current is supplied to light-emitting diode 34 and the light output thereof drops to zero.

While there has been described and illustrated one specific embodiment of the invention, it will be clear that variations in the details of the embodiment specifically illustrated and described may be made without departing from the true spirit and scope of the invention as defined in the appended claims.

What is claimed:

1. A portable electronic flea-repelling device adapted to be mounted on a domestic animal and activated by a self-contained battery comprising a printed circuit board, an electrical to ultrasonic transducer, means including an integrated circuit for deriving periodic electric pulses having a relatively low duty cycle and an ultrasonic carrier frequency, the printed circuit board carrying the transducer and a housing in which the integrated circuit is located so the transducer and integrated circuit housing areas are superimposed on each other, the printed circuit board including deposited leads for interconnecting the battery, transducer and integrated circuit so the electric pulses derived from the integrated circuit are connected to drive the transducer, the period, amplitude, duty cycle and carrier frequency of ultrasonic pulses derived from the transducer in response to the electric pulses derived from the integrated circuit being such as to repel fleas from the animal.

2. The device of claim 1 wherein the integrated circuit housing and transducer are mounted above the same face of the printed circuit board.

3. The device of claim 2 wherein the printed circuit board carries a spring clip for contacting a first electrode on a first face of the battery, a second electrode on a second face of the battery being urged by the spring clip against a contact area on the printed circuit board, the first and second battery faces being parallel to each other.

4. The device of claim 3 wherein the printed circuit board carries the battery so the battery is held in place between the printed circuit board and the clip.

5. The device of claim 4 wherein the electric pulse deriving means includes an oscillator crystal carried on the printed circuit board and connected to the integrated circuit by the deposited leads on the printed circuit board.

6. The device of claim 5 wherein the electric pulse deriving means includes passive components carried on the printed circuit board and connected to the integrated circuit by the deposited leads on the printed circuit board.

7. The device of claim 4 wherein the electric pulse deriving means includes passive components carried on the printed circuit board and connected to the integrated circuit by the deposited leads on the printed circuit board.

8. The device of claim 3 wherein spring clip includes a portion for contacting the first electrode, the spring clip portion being biased toward the printed circuit board so that it contacts the board when the battery is not held thereby at a position remote from all contact areas for the second battery electrode, and first and second mutually insulated test contacts on the printed circuit board connected by leads on the printed circuit board to the spring clip and a contact area for the first second electrode.

9. The device of claim 8 wherein the deposited leads on the printed circuit board for connecting the test contacts to the spring clip and the contact area for the first battery electrode include plated through holes on the printed circuit board and leads on a face of the printed circuit board opposite a face of the printed circuit board on which the spring clip and contact area for the second electrode are located.

10. The device of claim 1 wherein the printed circuit board carries a spring clip for contacting a first electrode on a first face of the battery, a second electrode on a second face of the battery being urged by the spring clip against a contact area on the printed circuit board, the first and second battery faces being parallel to each other.

11. The device of claim 10 wherein the printed circuit board carries the battery so the battery is held in place between the printed circuit board and the clip.

12. The device of claim 11 wherein the electric pulse deriving means includes an oscillator crystal carried on the printed circuit board and connected to the integrated circuit by the deposited leads on the printed circuit board. pulse deriving means includes an oscillator crystal carried on the printed circuit board and connected to the integrated circuit by the deposited leads on the printed circuit board.

13. The device of claim 12 wherein the electric pulse deriving means includes passive components carried on the printed circuit board and connected to the integrated circuit by the deposited leads on the printed circuit board.

14. The device of claim 11 wherein the electric pulse deriving means includes passive components carried on the printed circuit board and connected to the integrated circuit by the deposited leads on the printed circuit board.

15. The device of claim 1 wherein the electric pulse deriving means includes an oscillator crystal carried on the printed circuit board and connected to the integrated circuit by the deposited leads on the printed circuit board.

16. The device of claim 15 wherein the electric pulse deriving means includes passive components carried on the printed circuit board and connected to the integrated circuit by the deposited leads on the printed circuit board.

17. The device of claim 1 wherein the electric pulse deriving means includes passive components carried on the printed circuit board and connected to the integrated circuit by the deposited leads on the printed circuit board.

18. The device of claim 1 wherein the integrated circuit is sandwiched between opposite parallel faces of a case for the transducer and the printed circuit board.

19. A portable electronic flea-repelling device adapted to be mounted on a domestic animal and activated by a self-contained battery comprising a printed circuit board, an electrical to ultrasonic transducer, a circuit for deriving periodic electronic pulses having a relatively low duty cycle and an ultrasonic carrier frequency, the printed circuit board carrying the transducer and circuit, a spring clip carried by the printed circuit board for contacting a first electrode on a first face of the battery, a second electrode on a second face of the battery being urged by a force applied by the spring clip on the first electrode so that the second electrode abuts against and is held on a contact area on the printed circuit board, the first and second battery faces being parallel to each other so that the first face is remote from the printed circuit board, the printed circuit board including deposited leads for interconnecting the battery, transducer and circuit so the electric pulses derived from the circuit are connected to drive the transducer, the period, amplitude, duty cycle and carrier frequency of ultrasonic pulses derived from the transducer in response to the electric pulses derived from the circuit being such as to replace fleas from the animal.

20. The device of claim 19 wherein the printed circuit board carries the battery so the battery is held in place between the printed circuit board and the clip.

21. The device of claim 20 wherein the circuit is an integrated circuit.

22. The device of claim-19 wherein the spring clip includes a portion for contacting the first electrode, the spring clip portion being biased toward the printed circuit board so that it contacts the board when the battery is not held thereby at a position remote from all contact areas for the second battery electrode, and first and second mutually insulated test contacts on the printed circuit board connected by leads on the printed circuit board to the spring clip and a contact area for the first second electrode.

23. The device of claim 22 wherein the circuit is an integrated circuit.

24. The device of 22 wherein the deposited leads on the printed circuit board for connecting the test contacts to the spring clip and the contact area for the first battery electrode include plated through holes on the printed circuit board and leads on a face of the printed circuit board opposite a face of the printed circuit board on which the spring clip and contact area for the second electrode are located.

25. The device of claim 19 wherein the circuit is an integrated circuit.

* * * * *

UNITED STATES PATENT AND TRADEMARK OFFICE
CERTIFICATE OF CORRECTION

PATENT NO. : 4,890,580
DATED : January 2, 1990
INVENTOR(S) : Charles W. OWENS et al It is certified that error appears in the above-indentified patent and that said Letters Patent is hereby corrected as shown below:

In Column 11, line 27:

change "replace" to --repel--.

Signed and Sealed this

Twentieth Day of December, 1994

Attest:

BRUCE LEHMAN

*Attesting Officer*   *Commissioner of Patents and Trademarks*